US012006415B2

(12) United States Patent
Datsyuk et al.

(10) Patent No.: US 12,006,415 B2
(45) Date of Patent: Jun. 11, 2024

(54) CURABLE CASTING COMPOUND, MOLDED BODY MADE THEREFROM AND METHOD FOR PRODUCING THE MOLDED BODY

(71) Applicant: Schock GmbH, Regen (DE)

(72) Inventors: Vitaliy Datsyuk, Zwiesel (DE); Adam Orendorz, Zwiesel (DE); Roland Reichenberger, Regen (DE); Oskar Achatz, Bischofsmais (DE)

(73) Assignee: SCHOCK GMBH, Regen (DE)

(*) Notice: Subject to any disclaimer, the term of this patent is extended or adjusted under 35 U.S.C. 154(b) by 163 days.

(21) Appl. No.: 17/533,431

(22) Filed: Nov. 23, 2021

(65) Prior Publication Data
US 2022/0348743 A1 Nov. 3, 2022

(30) Foreign Application Priority Data
May 3, 2021 (DE) .................. 10 2021 111 384.9

(51) Int. Cl.
C08K 11/00 (2006.01)
B29C 39/00 (2006.01)
B29C 39/24 (2006.01)
B29C 39/38 (2006.01)
B29C 70/64 (2006.01)
B29K 503/08 (2006.01)
B29K 511/00 (2006.01)
B29L 31/00 (2006.01)
C08K 3/36 (2006.01)
C08L 33/12 (2006.01)

(52) U.S. Cl.
CPC .......... C08K 11/005 (2013.01); B29C 39/003 (2013.01); B29C 39/24 (2013.01); B29C 39/38 (2013.01); B29C 70/64 (2013.01); C08K 3/36 (2013.01); B29K 2503/08 (2013.01); B29K 2511/00 (2013.01); B29L 2031/769 (2013.01); C08K 2201/005 (2013.01); C08L 33/12 (2013.01); C08L 2207/20 (2013.01)

(58) Field of Classification Search
CPC .............................. C08K 11/005; B29C 70/64
See application file for complete search history.

(56) References Cited

U.S. PATENT DOCUMENTS

| 4,011,130 | A | * | 3/1977 | Worden | ................ D06N 3/00 162/207 |
| 5,218,013 | A | * | 6/1993 | Schock | ................ B29C 43/34 523/217 |
| 6,573,309 | B1 | | 6/2003 | Reitenbach | |
| 8,853,300 | B2 | | 10/2014 | Reichenberger | |
| 9,783,671 | B2 | | 10/2017 | Lorenz | |
| 9,834,646 | B2 | * | 12/2017 | Baxter | ................ B32B 21/02 |
| 2007/0259180 | A1 | | 11/2007 | Sugimoto | |
| 2008/0108742 | A1 | * | 5/2008 | Miyamoto | ................ C08K 9/04 524/451 |
| 2012/0115983 | A1 | | 5/2012 | Ramon Moreno | |
| 2013/0085211 | A1 | | 4/2013 | Baxter | |
| 2013/0186303 | A1 | | 7/2013 | Budina | |
| 2016/0108187 | A1 | | 4/2016 | Wendeln | |
| 2021/0009797 | A1 | | 1/2021 | Schabel | |
| 2021/0087383 | A1 | | 3/2021 | Datsyuk | |

FOREIGN PATENT DOCUMENTS

| CA | 1340127 C | 11/1998 |
| CA | 2583346 A1 | 5/2006 |
| CN | 104213648 A | 12/2014 |
| CN | 107177212 A | 9/2017 |
| CN | 107383783 A | 11/2017 |
| CN | 108147737 A | 6/2018 |
| CN | 111234549 A | 6/2020 |
| DE | 3832351 A1 | 4/1990 |
| DE | 102004055365 A1 | 5/2006 |
| DE | 102008026266 A1 | 12/2009 |
| DE | 102019204436 A1 | 10/2020 |
| EP | 0292628 A2 | 11/1988 |
| EP | 2951245 B1 | 8/2017 |
| EP | 3643751 A1 | 4/2020 |
| JP | H09263700 A | 10/1997 |
| JP | 2006077048 A | 3/2006 |
| JP | 2016517911 A | 6/2016 |
| KR | 20010108307 A1 | 12/2001 |
| KR | 20210036809 A1 | 4/2021 |
| RU | 2396286 C2 | 8/2010 |
| WO | 2012078021 A1 | 6/2012 |
| WO | 2013049499 A1 | 4/2013 |
| WO | 2019208028 A1 | 10/2019 |

OTHER PUBLICATIONS

Australian issued an Examination Report dated Nov. 3, 2022 regarding parallel Australian Patent Application No. 2021277587, 8 pages.
Russian Patent Office issued an Office Action dated Jun. 8, 2022 regarding parallel Russian Patent Application No. 2021130103, 7 pages.
European Patent Office issued an European Search Report dated Jun. 2, 2022 regarding parallel European Patent Application No. 21207134.4, 7 pages.
Krausmann et al., Proc. Natl. Acad. Sci. U.S.A. 114, 1880 (2017), 6 pages.
H. Schandl et al., in "Global Material Flows and Resource Productivity. An Assessment Study of the UNEP International Resource Panel" (U.N. Environment Programme, Paris, 2016), p. 30-34, 12 pages.

(Continued)

Primary Examiner — Ling Siu Choi
Assistant Examiner — Andrea Wu
(74) Attorney, Agent, or Firm — LUCAS & MERCANTI, LLP; Klaus P. Stoffel

(57) ABSTRACT

A curable casting compound, including a polymeric binder and at least one particulate filler incorporated therein, wherein the filler is ground fruit kernels and/or fruit shells, wherein either only the at least one filler composed of ground fruit kernels and/or fruit shells or additionally at least one further particulate inorganic filler is present.

15 Claims, No Drawings

(56) References Cited

OTHER PUBLICATIONS

A. Torres et al., Science 357(6355), 970 (2017)). According to Greenpeace (https://www-dev.greenpeace.org/test-iocaste/story/19351/sand-depletion/), 3 pages.
Rodriguez et al., Bioresource Technology 99, 5261 (2008), 9 pages.
JPO issued an Office Action dated Jun. 28, 2022 regarding parallel Japanese Patent Application No. 2021-181865, 13 pages.
German Patent and Trademark Office issued Office Action dated Dec. 9, 2021 regarding parallel German Patent Application No. DE 10 2021 111 384.9, 5 pages.
Canadian Intellectual Property Office issued an Examination Search Report dated Aug. 1, 2023 regarding parallel Canada Patent Application No. 3,140,882, 3 pages.
Chinese Patent Office issued an Office Action dated Jun. 1, 2023 regarding parallel Chinese Patent Application No. 202111429227.4, 11 pages.
Korean Patent Office issued an Office Action dated Nov. 24, 2023 regarding parallel Korean Patent Application No. 10-2021-0162759, 9 pages.
German Patent Office issued an Office Action dated Nov. 28, 2023 regarding parallel German Patent Application No. 10 2021 111 384.9, 5 pages.

* cited by examiner

CURABLE CASTING COMPOUND, MOLDED BODY MADE THEREFROM AND METHOD FOR PRODUCING THE MOLDED BODY

CROSS-REFERENCE TO RELATED APPLICATIONS

The present application claims priority of DE 10 2021 111 384.9, filed May 3, 2021, the priority of this application is hereby claimed, and this application is incorporated herein by reference.

BACKGROUND OF THE INVENTION

The invention relates to a curable casting compound comprising a polymeric binder and at least one particulate filler incorporated therein.

Typically, curable casting compounds or thermoset molding compounds as used, for example, for the production of kitchen sinks or sanitary ceramics can be produced in different ways or with different casting compound compositions. Various options are described, for example, in DE 38 32 351 A1, DE 10 2004 055 365 A1 or DE 10 2019 125 777.8. All these casting compounds are filler-containing polymerized compounds based on monomers and inorganic fillers.

The polymerizable compounds according to DE 38 32 351 A1 consist, for example, of 74% to 76% by weight of crystalline quartz sand, 24% to 26% by weight of a solution of polymethylmethacrylate in methyl methacrylate, wherein the proportion of polymethylmethacrylate in this solution is 18% to 25%, 1.2% by weight (based on the resin) of a peroxide, auxiliaries and 2% by weight of a crosslinking agent.

The casting compound known from DE 10 2004 055 365 A1 differs from the earlier casting compound by the extreme increase in the proportion of the crosslinker. The proportion of the crosslinker is at least 10% by weight, based on the proportion of the monomer in the binder solution. The use of crystalline quartz sand establishes a similarity with the existing composition. Patent application DE 10 2019 1251777.8 describes a molded article composed of quartz composite and of biobased monomers and crosslinkers, which greatly reduce the carbon footprint. However, what is described is the use of quartz sand in the formulation in a proportion of the filler particles based on the mass of the casting compound of 40-85%. It is thus possible in principle to use different casting compounds for production of the moldings. The casting compounds differ primarily in the polymeric binder content.

In the twentieth century, the rise in the consumption of natural resources in building infrastructure and transport infrastructure by a factor of 23 was observed (Krausmann et al., Proc. Natl. Acad. Sci. U.S.A. 114, 1880 (2017)). Sand and gravel, at 79% or 28.6 gigatonnes in 2010, are the fastest consumed category of natural resources, comparable to biomass and fossil fuels (H. Schandl et al., in "Global Material Flows and Resource Productivity. An Assessment Study of the UNEP International Resource Panel" (U.N. Environment Programme, Paris, 2016), p. 30-34). Even though sand extraction is being regulated, massive urbanization is causing the problem of sand shortage with severe economic and ecological effects (A. Torres et al., Science 357(6355), 970 (2017)). According to Greenpeace www-dev.greenpeace.org/test-iocaste/story/19351/sand-depletion), sand consumption will rise to 55 gigatonnes by 2060, and therefore a shortage of sand/quartz sand and rising costs will have to be expected in the future. As explained, however, quartz sand is used as the filler in casting compounds.

SUMMARY AND DETAILED DESCRIPTION OF THE INVENTION

The problem addressed by the invention is that of specifying an improved casting compound.

The problem is solved in accordance with the invention by providing a casting compound, in that the filler is ground fruit kernels and/or fruit shells, wherein either only the at least one filler composed of ground fruit kernels and/or fruit shells or additionally at least one further particulate inorganic filler is present.

The invention envisages use of ground fruit kernels or fruit shells as filler, either as the sole filler or as a partial substitute for an inorganic filler, such as the quartz sand used to date. A fruit kernel is understood to mean the hard inner core of a fruit, which is sometimes also referred to as stone; a fruit shell is understood to mean a hard outer shell of a fruit. These kernel or shell particles are incorporated into the polymer binder and are firmly embedded within the cured polymer matrix.

It has been found that, surprisingly, the ground fruit stones and/or shells can be incorporated into such a casting compound, in which case a molded article produced therefrom firstly has sufficient mechanical, physical and chemical properties that are comparable to or even better than the corresponding properties of molded articles comprising sand or quartz sand as filler that have been producible to date. More particularly, the casting compound enables the production of moldings having an impact resistance that is at least comparable and even improved over wide ranges, compared to a molding without any content of kernel or shell particles. Furthermore, the kernel or shell fillers added in accordance with the invention also impart lightweight building properties to the casting compound, meaning that the weight of the molded article produced is ultimately reduced. The kernel or shell particles may thus advantageously be mixed into the polymeric binder and be distributed homogeneously therein on their own and hence as a complete substitute or else together with inorganic filler particles and hence as an at least partial substitute, and optionally with further additives, for example a crosslinker. This casting compound may also be processed in a suitable manner to give molded articles, for example a kitchen sink or a shower tray, which can be effected by a thermally or chemically induced shaping method in which the casting compound is introduced into a mold and the matrix is induced to polymerize in the mold. It has been found that, surprisingly, the organic filler based on the ground fruit kernels and/or fruit shells is distributed homogeneously in the molding, which has very good mechanical, physical and chemical properties, especially with regard to impact resistance, and is additionally also of reduced weight.

The kernels and/or shells can be ground without difficulty to give a granular or pulverulent material of different size. Such granular or pulverulent material can be introduced into the polymer composites as a reinforcement made from renewable resources. The use of fruit kernels and/or shells, as described, offers the advantage of a lower weight of the finished molding. The density of olive stones, for example, at about 1.2 g/cm$^3$ is only half the density of quartz sand, which, according to its structure, is between 2.53 and 2.65 g/cm$^3$. This can save weight in a finished molding. This offers a significant facilitation both in the production and in the installation of the moldings on site.

Ground fruit kernels and/or fruit shells are the result of corresponding processing of wastes from food production. Ground fruit kernels and/or fruit shells contain many components in quite different concentrations. The most common constituents are fats, proteins, sugars, cellulose, hemicellulose, lignin and aromatic and aliphatic components (especially alcohols, glycosides, flavonones, limonoids, phenols and phenol alcohols and acid. During the dispersion process, the surface of the ground fruit kernels and/or fruit shells is subjected to mechanical or chemical treatment, with passage of the lignocellulosic short fibers from the filler surface into the polymer matrix, which leads to better compatibility and stronger binding between fillers and polymer matrix. This leads to very good mechanical properties of the molded article, which are sometimes even improved compared to known molded articles. In addition, a relatively small gradient in the coefficient of thermal expansion between ground fruit kernels and/or fruit shells and the polymer matrix results in better stability of the molded article to temperature change compared to quartz sand.

Fruit kernels and/or fruit shells are the solid wastes that arise when fruit is consumed. Spain alone produces about 400 000 tonnes of olive kernels annually (Rodriguez et al., Bioresource Technology 99, 5261 (2008)). The fruit kernel and/or fruit shell wastes typically cause contamination both in soil and in water. The composition of the fruit stones and/or shells contains phenolic compounds that impair the quality of water and soil. This problem can be countered by the use of the fruit kernels and/or fruit shells in composite materials. This means that, as well as the advantages that arise in this regard from the incorporation into the casting compound or the molded article, this use can also counter a further environmental problem and, as a result of the processing of waste, soil and water contamination can be reduced.

As well as the possibility that the casting compound contains just one kind of ground fruit kernel or fruit shell, it may also contain a mixture of multiple ground fruit kernels or fruit shells. This makes it possible, by means of a corresponding mixture of the different kernels or shells, some of which have different properties, especially chemical properties, to impart different properties to the casting compound and hence to the molded article.

Various ground fruit kernels or shells or the multitude of ground fruit kernels or shells that form the mixture are preferably, but not exclusively, selected from olive kernels, cherry kernels, peach kernels, avocado kernels, apricot kernels, mango kernels, plum kernels, almond shells, pistachio shells, argan shells, walnut shells, hazelnut shells. According to the invention, the size of the ground particles of fruit kernels or fruit shells should be in the range from 0.001 to 2000 μm, especially from 0.01 to 1000 μm, and preferably from 0.05 to 800 μm.

According to the invention, the concentration/proportion of the ground particles of fruit stones or shells or of the mixture of the ground particles of fruit stones or shells is in the range of 44-89% by weight. This is applicable to the proportion when only one kind of kernels or shells is used and to the proportion when a mixture of different kernels or shells or a kernel-shell mixture is used. The proportion of polymeric binder is accordingly 11-56% by weight, where the sum total of the respective proportions is of course 100% by weight. Any mixing ratio that arises from the intervals specified is disclosed here as being essential to the invention.

According to the invention, it is possible for solely organic filler particles in the form of the comminuted fruit kernels or fruit shells or corresponding mixtures to be present in the casting compound and also in the finished molded article. Alternatively, it is also conceivable in accordance with the invention to additionally incorporate at least one further particulate inorganic filler into the casting compound and hence into the molded article. What is then present is thus a mixture of organic and inorganic filler particles.

It is possible here for the inorganic filler to be selected from $SiO_2$, $Al_2O_3$, $TiO_2$, $ZrO_2$, $Fe_2O_3$, $ZnO$, $Cr_2O_5$, carbon, metals or metal alloys, or else any mixture thereof. The inorganic filler particles should have a particle size of 0.010 to 8000 μm, especially 0.05 to 3000 μm and preferably 0.1 to 1300 μm.

According to the invention, the ratio of the filler(s) in the form of the fruit kernels or fruit shells to the inorganic filler(s) may be in the range from 99:1 to 1:99 by weight. The proportion of the fruit kernels or of the fruit shells in relation to a proportion of inorganic filler particles, if any is additionally present in the casting compound, is thus variable to a high degree.

As described, the casting compound of the invention, like casting compounds known to date as well, comprises a polymeric binder which, in the cured state, forms a polymer matrix into which the filler particles are embedded. In a development of the invention. The polymeric binder here is a binder based on acrylic resin, polyester resin, epoxy resin, polyphenolic resin or melamine resin, or a mixture of at least two of these resins. Various binders are thus usable, into which, in accordance with the invention, the organic filler composed of the fruit kernels or shells is mixed.

The casting compound may also comprise a crosslinker. The proportion of the crosslinker here may be at least 2% by weight based on the proportion of the monomer of the binder, especially at least 5% by weight, preferably at least 10% by weight, and more preferably between 20-30% by weight.

A further alternative envisages a very substantially biological or biobased curable casting compound comprising:
  (a) one or more monofunctional and one or more polyfunctional acryloyl and/or methacryloyl biomonomers of plant or animal origin
  (b) one or more polymers or copolymers selected from polyacrylates, polymethacrylates, polyols, polyesters from recycled material or of plant or animal origin,
  (c) filler particles composed of ground fruit kernels and/or fruit shells or a mixture of filler particles composed of ground fruit kernels and/or fruit shells and inorganic filler particles,
  where constituents a) and b) form the polymeric binder, and the proportion of the mono- and polyfunctional acryloyl and methacryloyl biomonomer(s) is 10-40% by weight, the proportion of the polymer(s) or copolymer(s) is 1-16% by weight and the proportion of the filler particles, whether they be filler particles of ground fruit kernels and/or fruit shells, or whether they be a mixture of ground fruit kernels and/or fruit shells with inorganic filler particles, is 44-89% by weight.

This casting compound according to the invention has the feature, as well as the ground fruit kernel(s) and/or fruit shell(s), that it consists mainly, if not actually to an extent of 100%, of biological or natural materials, especially in relation to the crosslinking substances used. For instance, according to the invention, the mono- and polyfunctional acryloyl and methacryloyl biomonomers used are exclusively of plant or animal origin. Thus, no petrochemically obtained polymers are used here. A biomonomer is a monomer of a biopolymer. The term "polyfunctional" embraces bifunctional, trifunctional and higher-functionality biomonomers.

The polymers or copolymers used are preferably likewise purely of plant or animal origin, meaning that these substances are not of petrochemical origin. However, as an alternative to the use of substances of plant/animal origin, it is also possible here to use polymers or copolymers made from recycled material. Although this material is usually of petrochemical origin, no virgin material is used; instead, an existing but recycled material is reused, which is likewise advantageous from an environmental point of view. Since the biomonomers, aside from the inorganic fillers used that are likewise of natural origin, make up the greater proportion on the polymer side, a majority of petrochemical-based substances used to date within the casting compound according to the invention is replaced by biomaterial in the form of the biomonomers even when recycled material is used. Preference is of course also given to using polymers or copolymers of purely plant or animal origin, so as to result in this case in a casting compound consisting to an extent of 100% of natural materials, since, as described, the fillers are also purely of natural origin. This means that the molded article produced from the casting compound according to the invention is consequently a molded bioarticle consisting predominantly or preferably entirely of biological, i.e. natural, materials. The production of the composite biomaterials from the filler particles and the crosslinking materials that are produced from renewable sources reduces the consumption of the petrochemically produced materials and hence mineral oil consumption, and has a positive effect on the environment. Such a casting compound, except without addition of ground fruit kernels and/or fruit shells, is known from DE 10 2019 125 777 A1. In this casting compound, it is thus possible in accordance with the invention for the existing proportion of inorganic fillers, i.e. of the quartz sand for example, to be replaced completely, but at least partly, by the ground filler particles of the fruit kernels and/or fruit shells.

Since ground fruit kernels or fruit shells include organic substances such as fat, proteins, sugars, cellulose, hemicellulose, lignin in quite different concentrations, the filler content is consequently also biobased and therefore fits very well into this biological approach for this casting compound.

In spite of use of predominantly or exclusively natural materials including the proportion of ground fruit kernels or fruit shells for production of the casting compound or of the molded article, i.e., for example, of a kitchen sink, it has been found that, surprisingly, the molded article has mechanical properties that are very good, in some cases even better, especially with regard to impact resistance or scratch resistance compared to a known casting compound produced from petrochemically sourced crosslinking materials or such a molded article. An additional factor is the marked reduction in weight that results from the distinctly lower density of the ground fruit stones or shells in the casting compound and hence the molding.

A further variant of a casting compound comprises, as well as the proportion of ground fruit stones or shells:
(a) one or more monofunctional and one or more polyfunctional acryloyl and/or methacryloyl biomonomers of recycled or plant or animal origin
(b) one or more polymers or copolymers selected from polyacrylates, polymethacrylates, polyols, polyesters from recycled material or of plant or animal origin,
(c) filler particles composed of ground fruit kernels and/or fruit shells or a mixture of filler particles composed of ground fruit kernels and/or fruit shells and inorganic filler particles,
where constituents a) and b) form the polymeric binder, and the proportion of the mono- and polyfunctional acryloyl and methacryloyl biomonomer(s) is 10-40% by weight, the proportion of the polymer(s) or copolymer(s) is 1-16% by weight and the proportion of the filler particles, whether they be filler particles of ground fruit kernels and/or fruit shells, or whether they be a mixture of ground fruit kernels and/or fruit shells with inorganic filler particles, is 44-89% by weight.

It is a feature of this further casting compound batch according to the invention that it consists mainly of biological or natural materials, especially with regard to the crosslinking substances used. According to the invention, a mixture of various monofunctional monomers is used. According to the invention, the mixture of monofunctional acryloyl and methacryloyl monomers used consists partly of recycled material and partly of monomers of plant or animal origin, where at least one monomer is of recycled origin and at least one monomer is biobased, i.e. of plant or animal origin. There is thus barely any use of petrochemically sourced polymers here, apart from the recycled content, but this may also consist of recycled biobased material. In any case, no petrochemical-based virgin material is used within the scope of the recycled monofunctional monomer content. Polyfunctional monomers used are exclusively monomers of plant or animal origin. Where monomers, whether monofunctional or polyfunctional monomers, of plant or animal origin are used, these may be referred to as "biomonomers", where a "biomonomer" is a monomer of a biopolymer. The term "polyfunctional" embraces bifunctional, trifunctional and higher-functionality biomonomers.

A further variant of a casting compound comprises, as well as the proportion of ground fruit stones or shells:
(a) an unsaturated polyester formed from firstly a dicarboxylic acid and/or a corresponding anhydride and secondly from a diol in a molar ratio of 1.25:1 to 0.75:1, where the dicarboxylic acid and/or the anhydride has been at least partly functionalized with a free-radically reactive double bond,
(b) styrene derivative as reactive diluent,
(c) filler particles composed of ground fruit kernels and/or fruit shells or a mixture of filler particles composed of ground fruit kernels and/or fruit shells and inorganic filler particles,
where constituents a) and b) form the polymeric binder and the proportion of the polymeric binder(s) is 11-56% by weight and the proportion of the filler particles, whether they be filler particles composed of ground fruit kernels and/or fruit shells, or whether they be a mixture of ground fruit kernels and/or fruit shells with inorganic filler particles, is 44-89% by weight.

Such a casting compound, except without addition of ground fruit kernels and/or fruit shells, is known from EP 2 951 245 B1. This casting compound can thus, in accordance with the invention, be enriched with ground filler particles composed of the fruit kernels and/or fruit shells or additionally with at least one further particulate inorganic filler, or the ground filler particles may partly or fully replace any fillers present.

The casting compound according to the invention should in principle have a viscosity that permits injection into a mold. The viscosity should be between 1000-20000 cPs, preferably between 1500-15000 cPs and especially between 2000-12000 cPs.

In addition to the casting compound according to the invention, the invention further relates to a molded article produced using a curable casting compound according to the invention as described above. According to the casting compound used, with regard to the bulk components, it is possible to produce a molded article that is biobased to a greater or lesser degree. If a biobased casting compound is used, it is even possible to produce a molded article consisting to an extent of 100% of natural biological substances, and consequently a biocomposite body, i.e., for example, a biocomposite kitchen sink or the like.

It is possible here to produce different types of molded article. For instance, the molded article may be a kitchen sink, a shower tray, a washstand, a bathtub, a worktop or a floor, wall or roof panel, this enumeration being nonexhaustive.

The replacement of the high-density inorganic fillers by lightweight ground fruit stones and shells leads to a reduction in weight of the molded articles as kitchen sink, washbasin, shower tray or bathtub.

The invention further relates to a process for producing a molded article of the type described above, in which a casting compound of the type likewise described above is used, which is introduced into a mold in which it cures at room temperature or by a supply of heat, after which the cured molded article is removed from the mold. If curing is heat-induced, which depends on factors including the polymeric binder used, the temperature during the heat-induced curing should be between 60-140° C., preferably between 75-130° C. and especially 80-110° C.

In addition, the hold time during which the casting compound remains in the mold for heat-induced polarization should be between 15-50 min, preferably 16-45 min and especially 17-35 min.

In the present invention, the kitchen sinks or sanitary articles, in the material of the casting compound, have a content of ground fruit stones and/or shells in a concentration of 0.05% by weight or higher, up to a maximum of 75% by weight.

Some examples of the properties of the casting compound according to the invention and of the molded articles according to the invention that have been produced therewith are given hereinafter.

EXAMPLE 1

TABLE 1

Composition of gray-colored kitchen sinks without and with ground olive stones in different concentrations (figures in % by weight)

| | Comparative molded articles | Molded articles according to the invention | | | | | | | | |
|---|---|---|---|---|---|---|---|---|---|---|
| | | 1 | 2 | 3 | 4 | 5 | 6 | 7 | 8 | 9 |
| Recycled acrylic resin* | 25.0 | 25.0 | 25.0 | 25.0 | 25.0 | 25.0 | 25.0 | 25.0 | 25.0 | 25.0 |
| Biobased methacrylate monomers** | 2.0 | 2.0 | 2.0 | 2.0 | 2.0 | 2.0 | 2.0 | 2.0 | 2.0 | 2.0 |
| Quartz sand filler, 0.05-0.3 mm, Dorfner GmbH | 69.0 | 67.5 | 63.0 | 60.0 | 55.0 | 47.0 | 29.0 | 24.0 | 17.0 | 0.0 |
| Olive kernel granules, 0.05-0.8 mm, Schilling Ltd. | — | 1.5 | 6.0 | 9.0 | 14 | 22 | 40 | 45.0 | 52.0 | 69.0 |
| Micronized biopolymer, Münzing GMBH | 0.3 | 0.3 | 0.3 | 0.3 | 0.3 | 0.3 | 0.3 | 0.3 | 0.3 | 0.3 |
| Decane-1,10-diol dimethacrylate, Arkema | 1.0 | 1.0 | 1.0 | 1.0 | 1.0 | 1.0 | 1.0 | 1.0 | 1.0 | 1.0 |
| Peroxide, Pergan GmbH | 0.6 | 0.6 | 0.6 | 0.6 | 0.6 | 0.6 | 0.6 | 0.6 | 0.6 | 0.6 |
| Natural pigment, Kreidezeit Naturfarben GmbH | 2.0 | 2.0 | 2.0 | 2.0 | 2.0 | 2.0 | 2.0 | 2.0 | 2.0 | 2.0 |
| Biobased thixotropic additive, Ashland | 0.1 | 0.1 | 0.1 | 0.1 | 0.1 | 0.1 | 0.1 | 0.1 | 0.1 | 0.1 |

*Recycled acrylic resin is a solution of recycled PMMA (Kunststoff- und Farben-GmbH) in recycled methyl methacrylate (Monomeros des Valles) with viscosity 120-155 cPs.
**The mixture of biobased isobornyl methacrylate (Evonik Performance Materials GmbH) and biobased ethyl methacrylate (BCH Brühl-Chemikalien Handel GmbH)

The mixture for production of the polymer matrix is produced by dissolving the polymer in the monomers. For the moldings according to the invention, the appropriate amount of the ground olive kernels together with the crosslinker is additionally introduced with stirring for 30 min. Each finished casting compound is introduced into a casting mold for production of moldings in the form of simple kitchen sinks with a basin having a sink base and circumferential sidewalls, and a flat surface to the side, and polymerization is induced thermally. Proceeding from ambient temperature, the material is heated in a mold as described in patent application DE 10 2020 119 386.6, cured and demolded on completion of curing.

TABLE 2

Mechanical & thermal properties of the comparative moldings and of the moldings made from samples 1-9.

| PROPERTIES | Comparative molded articles | Sample 1 | Sample 2 | Sample 3 | Sample 4 | Sample 5 | Sample 6 | Sample 7 | Sample 8 | Sample 9 |
|---|---|---|---|---|---|---|---|---|---|---|
| Thermal cycling stability | OK | OK | OK | OK | OK | OK | OK | OK | OK | OK |
| Impact resistance, mJ/mm$^2$ | 2.8 | 2.8 | 2.9 | 3 | 3.1 | 3.4 | 3.3 | 3.3 | 3.2 | 3.5 |
| Scratch resistance | OK | OK | OK | OK | OK | OK | OK | OK | OK | OK |
| Abrasion resistance | OK | OK | OK | OK | OK | OK | OK | OK | OK | OK |
| Sink weight, kg | 13.6 | 13.2 | 12.9 | 12.6 | 12.1 | 11.7 | 11.3 | 11 | 10.7 | 9.8 |
| BCI content | 7.6 | 11.8 | 22.2 | 27.8 | 35.6 | 45.1 | 58.8 | 61.4 | 64.6 | 77.6 |

The tests were conducted as follows (this is also applicable to all further examples cited hereinafter, if the respective test was effected):

Thermal cycling stability test based on test method DIN EN 13310, in which the sink is treated alternately with cold and hot water for 1000 cycles. Hot water (T=90° C.) flows into the sink for 90 seconds, followed by relaxation for 30 seconds, and with further flowing cold water (T=15° C.) for the next 90 seconds. The cycle is ended by relaxation for 30 seconds.

For the impact resistance measurements, 12 samples of size 80×6 mm are cut out of the molded article. The measurements were conducted on the basis of test method DIN EN ISO 179-2 using the ZwickRoell HIT P pendulum impact tester.

For the scratch resistance measurements, one sample (100×100 mm) was cut out of each corresponding molded article. Subsequently, the visible face is scratched by means of a diamond tip under a load of 1 N-6 N installed in an Erichsen scratch tester. The topography was measured before and after the scratching (Mitutoyo Surftest SJ 500P).

For the abrasion resistance test, one sample (100×100 mm) was cut in each case. By means of a Taber abrasion tester from Frank, the test is conducted on the basis of test method DIN EN 13310, and abrasion is determined via the loss of weight after 100 rotations.

The BCI (Bio Carbon Index, %) of the chemical components is calculated by the following formula:

BCI=100×(BRC/C)

where BCI=biologically renewable carbon index in %
BRC=amount of biologically renewable carbon
C=total amount of carbon Comminuted fruit kernels and fruit shells are organic substances in which cellulose, hemicellulose and lignin are the most important chemical constituents. There is a resultant carbon content of 100% in the stones. With the increase in the proportion of ground fruit kernels and fruit shells in the formulation, we thus increase the proportion of biobased carbon.

In this test series, proceeding from a comparative molded article, the quartz sand content was increasingly replaced by olive kernel granules, while the other casting compound constituents remain the same.

It is found that there is an increase in impact resistance as the proportion of ground olive kernels increases and the proportion of quartz sand correspondingly decreases. While the impact resistance for the comparative molded articles is 2.8 mJ/mm$^2$, the impact resistance increases with an increasing proportion of olive kernel particles up to a maximum of 3.5 mJ/mm$^2$; sample 9 in which the quartz sand has been fully replaced by fruit kernel granules shows the highest value.

Likewise apparent is the decrease in weight with increasing content of ground olive kernels. While the comparative molded article has a weight of 13.6 kg, the weight of the molded article according to sample 9 is only 9.8 kg, meaning a decrease of 3.8 kg, with the same shape.

All other test results are also positive.

EXAMPLE 2

TABLE 3

Composition of molded articles without and with ground olive kernel stones with different olive stone sizes (figures in % by weight)

| | Comparative molded articles | Inventive molded article | |
|---|---|---|---|
| | | Sample 10 | Sample 11 |
| Recycled acrylic resin* | 23 | 23 | 23 |
| Biobased methacrylate monomers** | 4 | 4 | 4 |
| Quartz sand filler 0.05-0.3 mm, Dorfner GmbH | 69 | 57 | 57 |
| Olive stone granules 0.01-0.1 mm, Schilling Ltd. | — | 12 | |
| Olive kernel granules 0.3-0.6 mm, Schilling Ltd | | | 12 |
| Decane-1,10-diol dimethacrylate, Arkema | 2.2 | 2.2 | 2.2 |
| Micronized biopolymer, Münzing GMBH | 0.3 | 0.3 | 0.3 |
| Peroxide, Pergan GmbH | 0.6 | 0.6 | 0.6 |

TABLE 3-continued

Composition of molded articles without and with ground olive kernel stones with different olive stone sizes (figures in % by weight)

| | Comparative molded articles | Inventive molded article | |
|---|---|---|---|
| | | Sample 10 | Sample 11 |
| Biobased pigment, Orion Engineering Carbon | 0.8 | 0.8 | 0.8 |
| Ethyl cellulose, Ashland | 0.1 | 0.1 | 0.1 |

*Recycled acrylic resin is a solution of recycled PMMA (Kunststoff-und Farben-GmbH) in recycled methyl methacrylate (Monomeros des Valles) with viscosity 120-155 cPs.
**The mixture of biobased isobornyl methacrylate (Evonik Performance Materials GmbH) and biobased ethyl methacrylate (BCH Brühl-Chemikalien Handel GmbH)

TABLE 4

Mechanical & thermal properties of the comparative molding and the inventive moldings

| PROPERTIES | Comparative molded article | Inventive molded article | |
|---|---|---|---|
| | | Sample 10 | Sample 11 |
| Thermal cycling stability | OK | OK | OK |
| Impact resistance, mJ/mm$^2$ | 3.0 | 3.6 | 4.5 |
| Scratch resistance | OK | OK | OK |
| Abrasion resistance | OK | OK | OK |

The test series shows that, irrespective of the size of the fraction of olive kernel filler added, an increase in impact resistance is recorded. However, it is found that impact resistance is also dependent on fraction size. While an increase in impact resistance of 0.6 mJ/mm$^2$, namely from 3.0 mJ/mm$^2$ for the comparative molded article including no olive kernel filler to 3.6 mJ/mm$^2$ for sample 10, is found when olive kernel granules having a size of 0.01-0.1 mm are added, which replaces proportions of the quartz sand compared to the comparative molded article, there is an increase in impact resistance by 1.5 mJ/mm$^2$, i.e. to 4.5 mJ/mm$^2$, when olive kernel granules having a size of 0.3-0.6 mm are added.

The reason for the elevated impact resistance of sample 11 compared to sample 4 having a similar composition lies in the somewhat altered proportions of recycled acrylic resin and of the methacrylate monomer. The addition of the crosslinker in sample 11 also has an impact resistance-increasing effect since the flexible crosslinker has very good affinity for the lignocellulose surface of the fruit kernel particles. And finally, sample 4 has a higher proportion of very fine fruit kernel granules beginning with a size of 0.05 μm, compared to sample 11 containing granules having the smallest size of 0.3 μm.

EXAMPLE 3

In example 3, in the formulations of the applicant's known CRISTADUR® and CRISTALITE® brands, 10% by weight of the quartz filler in each case, based on the total weight of the sink, was replaced by ground olive kernels (0.1-600 μm). Comparative sinks and sinks of the invention were produced under identical conditions and in the same forms in each case. CRISTADUR® kitchen sinks were produced in the "Stone" color and in the Mono D-100L form. CRISTALITE® was produced in the "Bisques" color and in the Primus D-100L form.

TABLE 5

Mechanical & thermal properties of the comparative moldings and of the inventive moldings

| | Comparative molding | | Inventive molding | |
|---|---|---|---|---|
| PROPERTIES | CRISTALITE® | CRISTADUR® | Sample 12 (CRISTALITE®-based) | Sample 13 (CRISTADUR®-based) |
| Thermal cycling stability | OK | OK | OK | OK |
| Impact resistance, mJ/mm$^2$ | 2.0 | 2.4 | 2.8 | 2.5 |
| Scratch resistance | OK | OK | OK | OK |
| Abrasion resistance | OK | OK | OK | OK |
| Sink weight, kg | 15.4 | 16.2 | 14.3 | 15.0 |

Two molded articles produced in accordance with the invention, each having different compositions, but each with a comparable proportion of quartz sand and olive kernel granules, were compared here with two molded articles produced according to figures in the prior art. It is found that the molded articles according to the invention have higher impact resistance values than the known molded articles.

We claim:
1. A molded article formed as a kitchen sink or sanitary article, comprising a body made of a cured casting compound comprising a polymeric binder based on acrylic resin, polyester resin or a mixture of these resins, and at least one particulate filler incorporated therein, wherein the at least one particulate filler is composed of ground fruit kernels and/or fruit shells selected from the group consisting of olive kernels, apricot kernels, peach kernels, mango kernels, almond shells, pistachio shells, avocado kernels, argan shells, walnut shells, cherry shells and plum kernels, and additionally comprises at least one further particulate inor- ganic filler, and wherein the molded article has an impact resistance in a range of 2.5-4.5 mJ/mm$^2$.

2. The molded article according to claim 1, wherein the at least one particulate filler is comprised of a mixture of multiple different ground fruit kernels or fruit shells.

3. The molded article according to claim 1, wherein the at least one particulate filler has a particle size of 0.001-2000 μm.

4. The molded article according to claim 1, wherein the proportion of the polymeric binder is 11-56% by weight and the proportion of the at least one particulate filler has is 44-89% by weight.

5. The molded article according to claim 1, wherein the at least one further particulate inorganic filler is selected from $SiO_2$, $Al_2O_3$, $TiO_2$, $ZrO_2$, $Fe_2O_3$, $ZnO$, $Cr_2O_5$, carbon, metals or metal alloys and mixtures thereof.

6. The molded article according to claim 1, wherein the at least one further particulate inorganic filler particles have a particle size of 0.010 to 8000 μm.

7. The molded article according to claim 1, wherein the ratio of the at least one particulate filler in the form of fruit kernels or fruit shells to the at least one further particulate inorganic filler is in the range from 99:1 to 1:99 by weight.

8. The molded article according to claim 1, wherein the casting compound prior to curing has a viscosity of 1000-20000 cPs which permits injection into a mold.

9. A process for producing a molded article according to claim 1, wherein the casting compound is introduced into a mold, the casting compound is polymerized to form the molded article, and the polymerized molded article is removed from the mold.

10. The molded article according to claim 3, wherein the at least one particulate filler has a particle size of 0.01 to 1000 μm.

11. The molded article according to claim 10, wherein the at least one particulate filler has a particle size of 0.05 to 800 μm.

12. The molded article according to claim 6, wherein the at least one further particulate inorganic filler particles have a particle size of 0.05 to 3000 μm.

13. The molded article according to claim 12, wherein the at least one further particulate inorganic filler particles have a particle size of 0.1 to 1300 μm.

14. The molded article according to claim 8, wherein the casting compound prior to curing has a viscosity of 1500-15000 cPs.

15. The molded article according to claim 14, wherein the casting compound prior to curing has a viscosity of 2000-12000 cPs.

* * * * *